United States Patent [19]

Nakashio et al.

[11] 4,029,886

[45] June 14, 1977

[54] PROCESS FOR WATER-INSOLUBILIZATION OF MOLDED PULLULAN

[75] Inventors: Seizo Nakashio, Nishinomiya; Kozo Tsuji; Nobuhiro Toyota, both of Ibaragi; Fumio Fujita, Osaka, all of Japan

[73] Assignees: Sumitomo Chemical Company, Limited, Osaka; Hayashibara Biochemical Laboratories, Incorporated, both of Japan

[22] Filed: Feb. 27, 1975

[21] Appl. No.: 553,678

[30] Foreign Application Priority Data

Mar. 1, 1974 Japan .............................. 49-24389

[52] U.S. Cl. ..................................... 536/120; 536/1
[51] Int. Cl.² ......................................... C07H 15/04
[58] Field of Search ............ 260/209 R; 536/1, 120

[56] References Cited

UNITED STATES PATENTS

| 2,222,872 | 11/1940 | Leuck | 260/209 R |
| 2,222,873 | 11/1940 | Leuck | 260/209 R |
| 3,379,720 | 4/1968 | Reid | 260/209 R |
| 3,555,006 | 1/1971 | Storfer | 260/209 R |
| 3,870,537 | 3/1975 | Hijiya et al. | 260/209 R |

Primary Examiner—Johnnie R. Brown
Attorney, Agent, or Firm—Stevens, Davis, Miller & Mosher

[57] ABSTRACT

A molded pullulan can be water-insolubilized by treatment with, as the combination of a crosslinking agent with a catalyst, at least one of the combinations of (1) formaldehyde with zinc chloride, (2) glyoxal with magnesium chloride, and (3) formaldehyde or glyoxal with hydrogen chloride gas or sulfurous acid gas.

10 Claims, No Drawings

PROCESS FOR WATER-INSOLUBILIZATION OF MOLDED PULLULAN

This invention relates to a process for the water-insolubilization of a molded pullulan. More particularly, the invention is concerned with a process for making a molded pullulan water-insoluble, while retaining its excellent properties such as transparency, toughness, low gas permeability and non-pollution-causing property.

Pullulan is such a high molecular weight linear polymer that units of maltotriose, which is a trimer of glucose, have been repeatedly bonded through $\alpha$-1,6 linkages which are different from those of said trimer, and has the molecular structure represented by the formula,

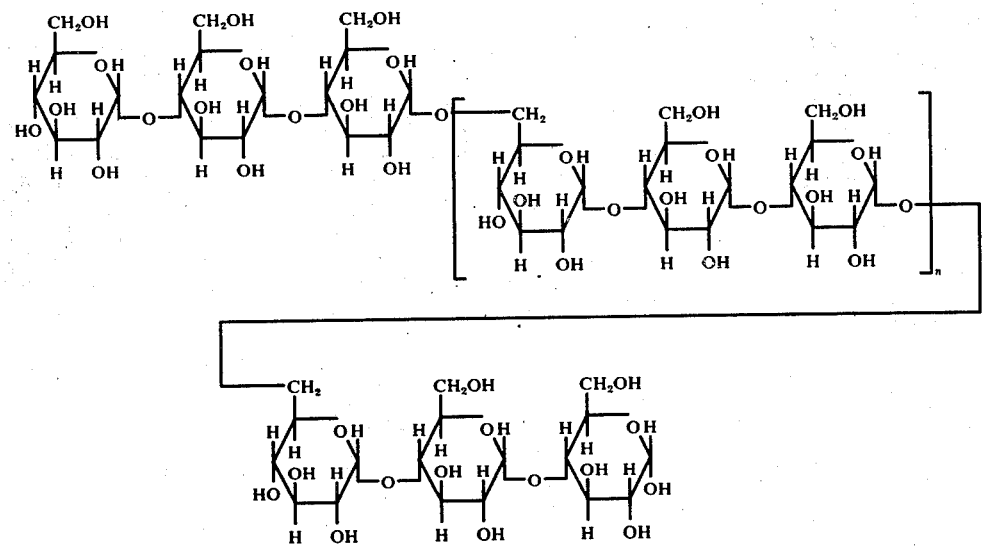

wherein $n$ is an integer of 20 to 10,000 which shows the polymerization degree.

While the pullulan used in the present invention contains glucose units in its molecule, it is entirely different in molecular structure and greatly different in its properties from starch, oxidized starch, enzymized starch, etherized starch, cationized starch, aminated starch, cellulose, alkyl cellulose, hydroxyalkyl cellulose, carboxymethyl cellulose and gum arabic which are conventional glucose derivatives composed mainly of glucose units, like in the case of pullulan. For example, pullulan is easily soluble in cold water, and its aqueous solution is stable over a long period of time, and does not cause gelation nor so-called "aging" phenomenon. Pullulan is, of course, different in properties also from polyvinyl alcohols, polyacrylamides, polyacrylic acids, sodium polyacrylates and polyvinyl pyrrolidones which are water-soluble high polymers.

At present, such resins (made from petroleum) as polyethylene, polypropylene, polystyrene, polyvinyl chloride and polymethyl methacrylate are being extensively utilized in various fields. Recently, however, these resins have come to encounter many difficulties at the time when they are discarded as waste matters. That is, the discarded resins pollute rivers and the sea, and, at the time of combustion, generate, like in the case of polyvinyl chloride, poisonous hydrochloric acid gases, or emit, like in the case of polyethylene, polypropylene and polystyrene, large heat to shorten the lives of incinerators.

According to the studies of the present inventors, it has been found that pullulan, which can be produced from inexpensive materials, has such excellent properties which are not seen in the existing resins that membranes, films, fibers and molded articles prepared from pullulan are transparent, tough, low in gas permeability, are spontaneously decomposed in soil and water, and do not generate poisonous gases nor high heat at the time of combustion, and hence cause no environmental pollution.

However, pullulan has such practical drawback that it is easily soluble in cold water, as mentioned previously. Accordingly, the water-insolubilization of pullulan is of great significance.

An object of the present invention is to provide a process for the water-insolubilization of a molded pullulan.

Another object of the invention is to provide a molded pullulan which is insoluble in water.

Other objects and advantages of the invention will become apparent from the following description.

For the water-insolubilization of pullulan, there may be thought out two processes. One is a process in which a hydrophobic functional group is introduced into pullulana, while the other is a process in which pullulan is crosslinked with a crosslinking agent to make the pullulan insoluble in water.

When pullulan is chemically modified by introduction of a hydrophobic functional group, a molded article produced from the modified pullulan somewhat varies in properties such as toughness, low gas permeability, etc. For example, a film obtained from completely acetylated pullulan becomes water-insoluble, but the gas permeability of the film becomes about 1,000 times larger than that of pullulan, and the impact strength thereof is markedly deteriorated. Accordingly, the first process cannot be said to be a preferable insolubilization process.

It is therefore significant to water-insolubilize a molded pullulan by crosslinking only the surface thereof with a crosslinking agent, while retaining the characteristic properties of the molded pullulan.

It is well known to crosslink high polymers having hydroxyl groups with aldehydes in the presence of an acid catalyst. As the acid catalyst, there is used an organic acid such as sulfuric, hydrochloric, acetic or chloroacetic acid, a salt such as zinc chloride, zinc nitrate, magnesium chloride, magnesium nitrate, sodium bicarbonate, sodium carbonate or sodium sulfate, or a gaseous substance such as hydrogen chloride or sulfurous acid gas.

However, when such a strong acid as sulfuric or hydrochloric acid is used as the acid catalyst in the crosslinking reaction of a molded pullulan with an aldehyde, the pullulan is decomposed since it is not excellent in acid resistance, with the result that the molded pullulan is deprived of its excellent properties. There are even such cases where the pullulan is decomposed into low molecular weight fragment and cannot maintain properties as a resin.

Further, when a weak acid is used as the catalyst, the crosslinking reaction of the molded pullulan does not progress sufficiently to make it impossible to impart satisfactory water resistance thereto.

As the result of extensive studies, the present inventors have found that a molded pullulan excellent in water resistance can be obtained by crosslinking the pullulan with the proper combination of a crosslinking agent with a crosslinking reaction catalyst, i.e. by adoption of such procedure that:
1. the molded pullulan is immersed in a solution containing a crosslinking agent in admixture with a catalyst,
2. the molded pullulan in which a catalyst has previously been dispersed is immersed in a solution containing a crosslinking agent, or
3. the molded pullulan is reacted with a gaseous mixture of a crosslinking agent and a catalyst.

Thus, the inventors have obtained a molded pullulan which is excellent in water resistance while retaining its transparency, toughness, low gas permeability, spontaneous decomposability, and property of causing no environmental pollution at the time of combustion.

The pullulan used in the present invention is not particularly restricted in procedure for preparation thereof. At present, it can be isolated and recovered as a tacky substance secreted in a culture liquor formed by culturing a strain of the genus *pullularia* which is an incomplete microorganism. That is, a strain of the species *Pullularia pullulans* is subjected to shaking culture at 24° C. for 5 days in a medium containing 10 % of partially hydrolyzed starch, 0.5 % of $K_2HPO_4$, 0.1 % of NaCl, 0.02 % of $MgSO_4.7H_2O$, 0.06 % of $(NH_4)_2SO_4$ and 0.04 % of yeast extract, whereby pullulan can be obtained as a tacky substance secreted from the cells into the culture liquor. If necessary, the cells are removed from the culture liquor by centrifugation, and the tacky substance is precipitated and separated by use of methanol, whereby purified pullulan is obtained. Pullulan somewhat varies in physical properties depending on the kind of the strain used. In the present invention, however, pullulan obtained from any strain may be used.

The molecular weight of the pullulan used in the present invention is not particularly limited, but is ordinarily from 10,000 to 5,000,000, and preferably from 50,000 to 1,000,000 in view of the strength of membrane, film, sheet, fiber or general molded article obtained from the pullulan.

In water-insolubilizing a molded pullulan according to the present invention, the molded pullulan is not particularly limited in shape, and may be in any of such forms as, for example, membranes, films, sheets, fibers, pipes, rods and profiles. The films, sheets and fibers may be those which have been stretched.

The membrane, film, sheet, fiber, pipe, rod or profile comprising pullulan which is used in the present invention is not particularly restricted in preparation process, and may be prepared by any process. For example, there may be used a film formed by casting an aqueous pullulan solution on a glass plate, or a molded article obtained by use of an injection molding machine.

In carrying out the crosslinking reaction in the present invention, a solvent may or may not be used. The solvent, when this is used, is preferably a solvent which does not dissolve pullulan in order that only the surface of pullulan is crosslinked and insolubilized. Examples of such solvents are general compounds which include alcohols such as methanol, ethanol, and propanol; aromatic hydrocarbons such as benzene, toluene, xylene, ethylbenzene and cumene; aliphatic and alicyclic hydrocarbons such as propane, butane, pentane, hexane, heptane, cyclohexane and methylcyclohexane; halogenated, nitrated and sulfonated derivatives of said hydrocarbons; ketones such as acetone, methyl ethyl ketone and acetophenone; ethers such as diethyl ether, dioxane and tetrahydrofuran; and esters such as methyl acetate, butyl acetate, ethyl propionate and methyl benzoate. Preferable among these are those which can dissolve aldehydes, used as crosslinking agents, and catalysts, and are miscible with water. Concrete examples of these are methanol, ethanol, acetone and methyl ethyl ketone.

In the present invention, the amount of the solvent to be used is not particularly limited, but is preferably 5 to 10,000 parts of weight per 100 parts by weight of pullulan. The solvent may contain 1 to 30 wt % of water.

The aldehydes which are used as crosslinking agents in the present invention are formaldehyde and glyoxal. The formaldehyde may be a gaseous formaldehyde formed by thermal decomposition of $\alpha$-polyoxymethylene or the like, or may be used in the form of a solution. The glyoxal may also be used in the form of a gas or a solution. The amount of aldehyde used is 0.5 to 500 parts by weight, preferably 1 to 300 parts by weight per 100 parts by weight of the molded pullulan.

The kind of the catalyst, which can effectively be used in crosslinking a molded pullulan according to the present invention, varies depending on the kind of the crosslinking agent used. The reaction of hydroxyl groups with aldehydes is ordinarily conducted in the presence of an acid catalyst. However, when the crosslinking reaction of pullulan is effected in an organic solvent in the presence of a strong acid such as sulfuric or hydrochloric acid, the pullulan is undesirably decomposed since it is low in acid resistance, as mentioned previously. In contrast, when the crosslinking reaction is effected in the presence of a weak acid, the reaction does not progress to make it impossible to accomplish the object of water-insolubilization of molded pullulan. In the reaction of crosslinking a molded pullulan with an aldehyde, when zinc chloride is used as the catalyst in the case of formaldehyde, or when magnesium chloride is used as the catalyst in the case of glyoxal, the molded pullulan becomes water-insoluble while retaining the characteristic properties of pullulan. Alternatively, in crosslinking a molded pullulan with gaseous formaldehyde or glyoxal, sulfurous acid gas or hydrochloric acid gas is preferably used as the catalyst.

The amount of the catalyst used is 0.0001 to 50 parts by weight, preferably 0.001 to 5 parts by weight per 100 parts by weight of formaldehyde or glyoxal. The catalyst may be added to the reaction solution or may be dispersed in the molded pullulan.

The reaction conditions are not particularly limited, but the reaction temperature is 30° to 200° C., preferably 50° to 150° C., since pullulan decomposes at above 250° C., while the reaction pressure is ordinarily 1 to 50 kg/cm$^2$.

According to the process of the present invention, a water-resistant novel molded article composed of pullulan can be produced by overcoming such drawback of pullulan that when used as a molded article, it is easily soluble in cold water, and while retaining such excellent properties of pullulan as transparency, toughness, low gas permeability, spontaneous decomposability and property of causing no environmental pollution at the time of combustion, which are characteristics of membrane, film, sheet, fiber, pipe, rod or profile of pullulan.

The present invention is illustrated in more detail below with reference to examples, but the invention is not limited to the examples. In the examples, all parts are by weight.

EXAMPLE 1

To a 500 cc. autoclave was added a mixture comprising 300 parts of acetone, 16 parts of a 37 % aqueous formaldehyde solution and 2 parts of zinc chloride. Into the said mixture, a film (50 mm × 50 mm × 50 $\mu$, 0.8 part), prepared by casting a 25 % aqueous solution of pullulan (molecular weight 150,000) on a glass plate was immersed, and reacted at 100° C. for 3 hours with gentle stirring. The reaction pressure became about 5 kg/cm$^2$. After the reaction, the film was taken out, washed with acetone and then dried. Physical properties of the thus obtained film were as set forth in Table 1.

Table 1

|  | Water solubility | Transparency | Gas-permeability (cc/cm$^2$.24 h.atm.) (50$\mu$) O$_2$ | CO$_2$ | Tensile strength (kg/cm$^2$) |
|---|---|---|---|---|---|
| Pullulan | Soluble | Excellent | 2.1 | 16.3 | 420 |
| Formaldehyde crosslinked pullulan | Insoluble | Excellent | 2.3 | 16.8 | 370 |

As is clear from Table 1, the pullulan film could be water-insolubilized according to the process of the present invention, while retaining characteristic properties inherent to pullulan.

COMPARATIVE EXAMPLE 1

To a three-necked flask equipped with a reflux condenser, a stirring rod, a thermometer and a dropping funnel was added a mixture comprising 100 parts of pullulan (molecular weight 150,000), 270 parts of acetic anhydride and 240 parts of pyridine. Subsequently, the mixture was reacted at 100° C. for 8 hours with stirring to acetylate the pullulan. After the reaction, the reaction liquid was poured into 2,000 parts of methanol to deposit precipitates of acetylated pullulan. The precipitates were collected and dissolved in 300 parts of chloroform. The resulting solution was poured into 2,000 parts of water to deposit precipitates again. The precipitates were sufficiently washed with water and methanol, and then dried under reduced pressure at 80° C. for 12 hours to obtain 151 parts of acetylated pullulan having an acetylation degree of 2.91. Physical properties of the acetylated pullulan were as set forth in Table 2.

Table 2

|  | Water solubility | Gas-permeability (cc/cm$^2$.24 h.atm.) (50$\mu$) (O$_2$) | Izod impact strength with notch (kg.cm/cm$^2$) |
|---|---|---|---|
| Acetylated pullulan | Insoluble | 4,000 | 1.5 |
| Pullulan | Soluble | 2.1 | 17.0 |

Thus, acetylated pullulan becomes water-insoluble, but cannot retain the excellent properties of pullulan.

EXAMPLE 2

Example 1 was repeated, except that 16 parts of the 37 % aqueous formaldehyde solution was replaced by 15 parts of a 40 % aqueous glyoxal solution, and 2 parts of the zinc chloride was replaced by 2 parts of magnesium chloride. Physical properties of the resulting film were set forth in Table 3.

Table 3

|  | Water solubility | Transparency | Gas-permeability (cc/cm$^2$.24 h.atm.) (50 $\mu$) (O$_2$) | Tensile strength (kg/cm$^2$) |
|---|---|---|---|---|
| Glyoxal-crosslinked pullulan | Insoluble | Excellent | 2.4 | 390 |

COMPARATIVE EXAMPLE 2

Example 1 was repeated, except that 16 parts of the 37 % aqueous formaldehyde solution was replaced by 15 parts by a 40 % aqueous glyoxal solution. The resulting film was not water-insoluble but partly dissolved in water.

Thus, in the case where the crosslinking reaction is effected by use of glyoxal, the use of magnesium chloride as the catalyst is preferable.

COMPARATIVE EXAMPLE 3

Example 1 was repeated, except that 2 parts of the zinc chloride was replaced by 2 parts of sodium sulfate. The resulting film was not water-insoluble but partly dissolved in water.

Thus, in the case where the crosslinking reaction is effected by use of formaldehyde, the use of zinc chloride as the catalyst is preferable.

EXAMPLE 3

In a three-necked flask was fixed a film (50 mm × 50 mm × 50 μ, 0.8 part) prepared by casting a 25 % aqueous solution of pullulan (molecular weight 150,000) on a glass plate. Subsequently, the film was treated at 120° C. for 5 minutes by introducing 80 ml/min. of formaldehyde gas from one inlet and 24 ml/min. of sulfurous acid gas from the other inlet. Thereafter, the film was washed with acetone and then dried. The thus treated film was insoluble in water.

What is claimed is:

1. A process for the water-insolubilization of a molded pullulan, wherein molded pullan is treated with, at least one combination of a crosslinking agent with a catalyst, said combinations being selected from the group consisting of (1) formaldehyde with zinc chloride, (2) glyoxal with magnesium chloride, and (3) gaseous formaldehyde or glyoxal with hydrogen chloride gas or sulfurous acid gas.

2. A process according to claim 1, wherein the crosslinking agent is used in an amount of 0.5 to 500 parts by weight per 100 parts by weight of the molded pullulan.

3. A process according to claim 1, wherein the catalyst is used in an amount of 0.0001 to 50 parts by weight per 100 parts by weight of the formaldehyde or glyoxal.

4. A process according to claim 1, wherein the molded pullulan is treated at a temperature of 30° to 200° C.

5. A process according to claim 1, wherein the molded pullulan is treated under a pressure of 1 to 50 $kg/cm^2$.

6. A process according to claim 1, wherein the molded pullulan is treated in the presence of a solvent.

7. A process according to claim 6, wherein the solvent is one member selected from the group consisting of alcohols; aromatic, aliphatic and alicyclic hydrocarbons; halogenated, nitrated and sulfonated derivatives of said hydrocarbons; ketones; ethers; and esters.

8. A process according to claim 7, wherein the solvent is methanol, ethanol, acetone or methyl ethyl ketone.

9. A process according to claim 8, wherein the solvent contains 1 to 30 wt % of water.

10. A process according to claim 6, wherein the solvent is used in an amount of 5 to 10,000 parts by weight per 100 parts by weight of the molded pullulan.

* * * * *